(12) United States Patent
Greene

(10) Patent No.: US 6,575,410 B2
(45) Date of Patent: Jun. 10, 2003

(54) GLIDE SLOPE TRACKING SYSTEM

(75) Inventor: Leonard M. Greene, White Plains, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 0 days.

(21) Appl. No.: 09/841,062

(22) Filed: Apr. 25, 2001

(65) Prior Publication Data

US 2002/0158168 A1 Oct. 31, 2002

(51) Int. Cl.$^7$ .................................................. G05D 1/12
(52) U.S. Cl. ........................ 244/186; 244/180; 244/184; 244/187
(58) Field of Search ................................ 244/186, 187, 244/184, 180

(56) References Cited

U.S. PATENT DOCUMENTS

| | | | | | |
|---|---|---|---|---|---|
| 3,295,796 A | * | 1/1967 | Gaylor | ........................ | 244/187 |
| 3,327,973 A | * | 6/1967 | Kramer et al. | ............... | 244/186 |
| 3,447,765 A | * | 6/1969 | Doniger et al. | ............. | 244/187 |
| 3,523,664 A | * | 8/1970 | Doniger et al. | ............. | 244/187 |
| 3,652,835 A | * | 3/1972 | Devlin et al. | ............... | 244/187 |
| 3,773,281 A | * | 11/1973 | Doniger et al. | ............. | 244/184 |
| 3,801,049 A | * | 4/1974 | Simpson et al. | ............. | 244/184 |
| 3,887,148 A | * | 6/1975 | Devlin | ........................ | 244/186 |
| 3,892,373 A | * | 7/1975 | Doniger | ........................ | 244/186 |
| 3,947,809 A | * | 3/1976 | Bateman | | |
| 4,006,871 A | * | 2/1977 | Simpson | ........................ | 244/186 |
| 4,114,842 A | * | 9/1978 | Hofferber et al. | ........... | 244/180 |
| 4,354,237 A | * | 10/1982 | Lambregts et al. | | |
| 5,170,163 A | * | 12/1992 | Collins et al. | ............... | 244/187 |
| 5,590,853 A | * | 1/1997 | Greene | ........................ | 244/184 |

* cited by examiner

*Primary Examiner*—Michael J. Carone
*Assistant Examiner*—Lulit Semunegus
(74) *Attorney, Agent, or Firm*—Dennison, Schultz & Dougherty

(57) ABSTRACT

An airborne glide slope tracking system includes a radio altimeter for producing a signal indicative of the instantaneous altitude of the aircraft and a glide slope error indicator for producing a signal indicative of the angular deviation from glide slope. The two signals are multiplied to produce a glide slope error signal in feet and fed to a summing device directly and through a lead filter to generate a signal for a throttle servo to increase or decrease the thrust of the aircraft. A longitudinal accelerometer signal is then added to a signal indicative of a difference between an aircraft's reference angle of attack and actual angle of attack to produce a signal to a pitch command to provide an angle which will be sustained by the power of the aircraft.

4 Claims, 2 Drawing Sheets

GLIDE SLOPE TRACKING SYSTEM

FIELD OF THE INVENTION

This invention relates to an airborne glide slope tracking system and more particularly to an airborne glide slope tracking system for automatically or semiautomatically landing an aircraft.

BACKGROUND OF THE INVENTION

The need for a highly reliable and safe landing system for aircraft has been recognized. It has also been recognized that such system should be fully operable under adverse weather conditions with reliability. Such systems should automatically land an aircraft safety in fog or rain at night, with heavy pay loads and provide smooth landings under any such conditions. In order to meet the requirements of reliability and to provide for smooth landings under adverse conditions, an automatic landing system must contain control equipment which is insensitive to outside disturbances normally encountered in landings.

An early system for an integrated glide path/flare automatic flight control is disclosed in the U.S. Patent of Doniger U.S. Pat. No. 3,892,373. As disclosed in the Doniger patent, a system controls an aircraft during integrated glide path capture and tracking and flare maneuvers when automatically landing the aircraft. That system eliminated the need for explicit switching to initiate the flare maneuver and the flare control channel is effectively exercised during the glide path capture and tracking maneuvers to eliminate extensive pre-land testing that would otherwise be required if the flare control channel were switched on at lower critical altitudes.

A more recent development in a flare control system for the automatic landing of an aircraft is disclosed in my copending application entitled "Airborne Safe Landing Power Control System and Method," Ser. No. 09/467,072 which was filed on Dec. 20, 1999. That system includes a computer and a minimum air speed program as a function of altitude. A radio altimeter or the like senses the instantaneous altitude of the aircraft while a pitot tube or the like measures indicated air speed. A computer program compares air speed with actual air speed for a given altitude. A server motor is provide for decreasing engine thrust when the actual air speed exceeds the programmed air speed at any given altitude. In addition, an inhibitor inhibits the decrease in engine thrust if the air speed drops below the programmed air speed.

The present invention which also embodies a computer and program can be programmed into the same computer as my aforementioned airborne safe landing power control system to provide a fully automated landing system, or may be embodied in a semiautomated landing system wherein the pilot exercises minor control adjustments during the glide slope maneuver.

It is presently believed that a glide slope tracking system in accordance with the present invention will more closely maintain a referenced speed and sink rate then prior art devices. Such systems should also reduce glide slope errors and automatically or semiautomatically correct for any such errors. Such systems will more tightly control glide slope tracking throughout the glide slope maneuver from capture to flare. In addition, the glide slope tracking system disclosed herein controls the flight path by changes in power with automatic or semiautomatic change in pitch in response to any change in power.

BRIEF SUMMARY OF THE INVENTION

In essence, the present invention contemplates a glide slope tracking system for maintaining an aircraft on a preselected glide slope at a preselected speed during a landing approach. The system includes a computer, computer program, means such as a radio altimeter and means for generating a signal indicative of glide slope error. The system also includes means such as a throttle servo for adjusting the power of an aircraft in response to glide slope error. In addition, means for generating a signal indicative of a difference between the aircraft's reference angle of attack and the aircraft's actual angle of attack or air speed error as well as an accelerometer are also provided. The accelerometer is responsive to changes in power and generates a signal which is combined with the signal indicating the difference between the aircraft's reference angle of attack and its actual angle of attack to produce an output signal. This output signal produces a flight direction pitch command to provide a pitch angle which will be sustained by the power of the aircraft.

The preferred embodiment of the invention also includes a filter or LaPlac transform function to provide a signal which is indicative of how fast the glide slope is changing. This signal is added to the signal which is indicative of glide slope error and height to drive a throttle servo.

The invention will now be described in connection with the accompanying drawings.

DETAILED DESCRIPTION OF THE PREFERRED EMBODIMENTS OF THE INVENTION

An airborne glide slope tracking system in accordance with the present invention utilizes thrust and a longitudinal accelerometer command to provide a fully automatic or semiautomatic change in pitch to a pitch that will be sustained by the change in power.

Figure 1:
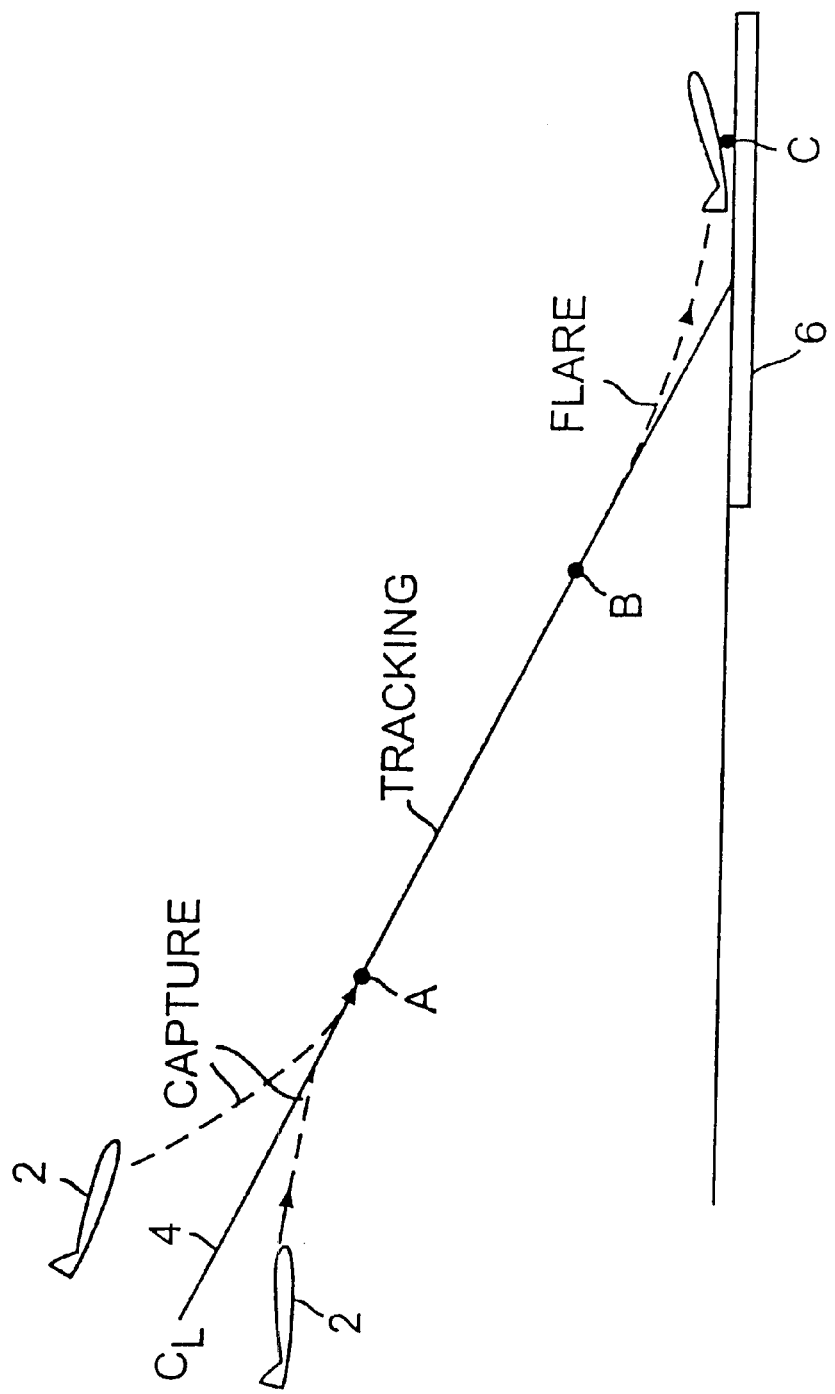
FIG. 1 is a diagrammatic representation showing a typical glide path capture and flare maneuver as an aircraft approaches and lands at an airport.
Figure 2:
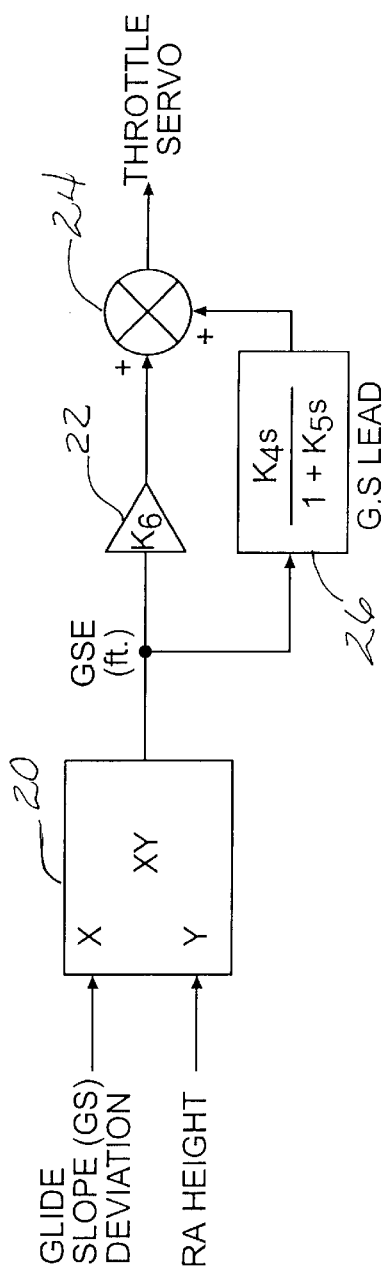
FIG. 2 is a block diagram illustrating a first portion of a glide slope tracking system for controlling thrust to maintain an aircraft on its glide slope at a preselected speed in accordance with the present invention.

As illustrated in FIG. 1, an aircraft 2 is controlled by conventional means to capture an ILS glide path signal or centerline 4, as for example, disclosed in the aforementioned U.S. Pat. No. 3,892,373 of Doniger. That disclosure is incorporated herein in its entirety by reference. At a point A from either level flight below the centerline 4 or from a descending flight above the centerline 4, the aircraft 2 tracks the beam centerline 4 from point A to point B. At point B, the flare maneuver is initiated and controls the aircraft to touch down at point C. A method and system for automatically controlling the flare maneuver of the aircraft is disclosed in my aforementioned copending application for an airborne pitch angle control system. It is during the glide slope tracking i.e., from point A to point B, that the present airborne glide slope tracking system is applicable.

In a system in accordance with the present invention, an aircraft is equipped with conventional flight condition sensors suitably mounted aboard the aircraft. For example, the aircraft is equipped to capture an ILS glide path beam centerline as well as an indication of glide slope error as shown in box number 20 by a "x" in the upper left hand portion thereof. The aircraft is also equipped with a radio altimeter which generates a signal "y" shown in the lower left hand portion of box 20. These two signals are multiplied to provide a signal which is glide slope error in distance as for example in feet. That signal is multiplied by a constant by multiplier 22 and fed to a summing junction 24. The glide slope error in feet signal is also fed to a lead filter 26 or LaPlac Transform entitled GSlead which makes the throttle servo sensitive to the rate of change of glide slope error and feeds the signal to the summing junction 24. The summing junction 24 then feeds a sum signal to a throttle servo to advance or retard the aircraft throttles to thereby increase or decrease the thrust.

Figure 3:
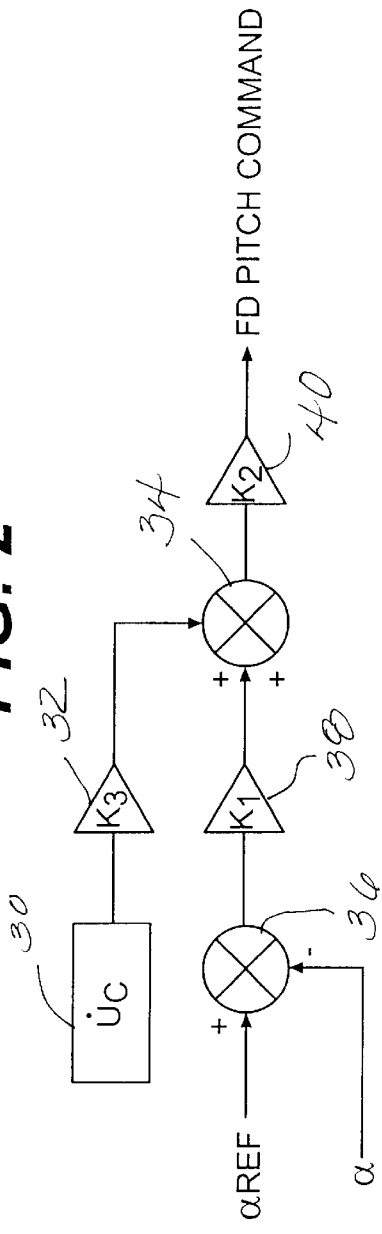
FIG. 3 is a block diagram of a second portion of the glide slope tracking system for changing the angle of attack of the aircraft in response to a change in power as illustrated in FIG. 2.

A second portion of the system is illustrated in FIG. 3. This portion of the system is responsive to changes in thrust resulting from the first portion of the system. In the second portion of the system an accelerometer 30 generates a complimentary acceleration signal i.e., a signal indicative of the longitudinal acceleration of the aircraft. That signal is fed to a multiplier 32 which multiplies the signal by a constant $K_3$ to produce a signal that is fed to a second summing junction 34.

The aircraft also includes means for sensing the angle of attack such as an angle of attack vane. The angle of attack vane generates a signal which is indicative of the aircraft's actual angle of attack. The system also includes an input of a reference angle of attack signal which is a constant based on the aircraft's speed. The two signals are fed to a third summing junction 36.

The third summing junction 36 sums signals which indicate the aircraft's reference angle of attack and actual angle of attack and feeds an output signal to a multiplier 38. The multiplier 38 multiplies the output signal by a constant $K_1$ and feeds the resulting signal to the summing junction 34. The output from the summing junction 34 is then fed to a multiplier 40 which multiplies the resulting signal by a constant $K_2$. The output from the multiplier 40 is then fed to a flight director (FD) pitch command.

The operation of the glide slope tracking system disclosed herein will be described in connection with an aircraft which is in stable flight but below the glide path. The aircraft under normal conditions is flying at a constant speed which means that the sum of the forces on the aircraft are equal to zero. Under these conditions thrust is equal to drag and the lift is equal to weight, that is mass times gravity.

When the glide slope capture system is turned on, the glide slope deviation angle from a glide slope receiver is multiplied by the aircraft's height from a radio altimeter and a constant resulting in an approximation of the glide slope deviation distance as for example in feet. This causes the throttle servo to increase the thrust.

The increase in thrust results in aircraft acceleration which causes the aircraft speed to increase lift. This results in or causes the aircraft to accelerate vertically which causes the vertical speed to increase. As a result, the height increases which reduces the glide slope error. The flight path angle has increased to accomplish this change. Then if the pitch angle has not changed, the angle of attack decreases. This will cause the angle of attach to deviate from the reference angle of attack resulting in a positive pitch command. This pitch command causes an autopilot to move the elevator control to increase the angle of attack which increases drag and slows the aircraft down to a reference speed where the actual angle of attack is equal to the reference angle of attack.

As illustrated in FIG. 3, a pitch command signal is fed to a flight director. The flight director may then be used to indicate a need for manual correction. In other applications the pitch command signal is used to automatically control the aircraft's elevator to provide a fully automated system. This system can then be combined with my aforementioned system for control of the flare maneuver to provide a fully automated landing system which is operable under many if not most adverse weather conditions.

While the invention has been described in connection with its preferred embodiments, it should be recognized and understood that changes and modifications can be made therein without departing from the scope of the appended claims.

What is claimed is:

1. An airborne glide slope tracking system comprising a computer and program for automatically maintaining an aircraft on its glide slope during a landing maneuver, said system including means for receiving a glide slope error signal which is indicative of angular deviation from flight path, means for generating a signal indicative of the instantaneous altitude of the aircraft and means for multiplying the glide slope error signal by the signal indicative of the instantaneous altitude of the aircraft to thereby provide a first resulting signal indicative of the glide slope error in distance, a first summing junction and means for multiplying the signal indicative of the glide slope error in distance by a first constant to produce a second resulting signal and feeding the second resulting signal to said first summing device, a lead filter and means for passing the signal indicative of the glide slope error in distance through said lead filter to said first summing device to thereby produce a first combined signal for activating a throttle servo to thereby increase or decrease thrust; a second summing junction, means for generating a signal indicative of the aircraft's longitudinal acceleration and means for multiplying the longitudinal acceleration signal by a second constant to produce a third resulting signal and feeding the third resulting signal to said second summing junction, a third summing junction and means for inputting a signal indicative of the aircraft's reference angle of attack and feeding the signal indicative of the reference angle of attack to said third summing junction, means for generating a signal indicative of the aircraft's actual angle of attack and for feeding that signal to said third summing junction to thereby generate a fourth resulting signal indicative of the difference between the reference angle of attack and the actual angle of attack, means for multiplying the fourth resulting signal by a third constant and adding said fourth resulting signal in said second summing junction to provide a second combined signal and means for multiplying said second combined signal by a fourth constant to thereby produce a pitch command signal to provide a pitch angle that will be sustained by the power of the aircraft.

2. An airborne glide slope tracking system according to claim 1, in which said means for generating a signal indicative of the instantaneous altitude of the aircraft is a radio altimeter.

3. An airborne glide slope tracking system according to claim 2, wherein said pitch command signal is fed to an autopilot.

4. An airborne glide slope tracking system according to claim 2, wherein said pitch command signal is fed to a flight director so that the pilot adjusts the elevator controls to make the actual angle of attack equal to the reference angle of attack.

* * * * *